Dec. 6, 1927.
W. F. SUTHERLAND
1,651,482
ELECTRICAL MEASURING INSTRUMENT
Filed June 26. 1925
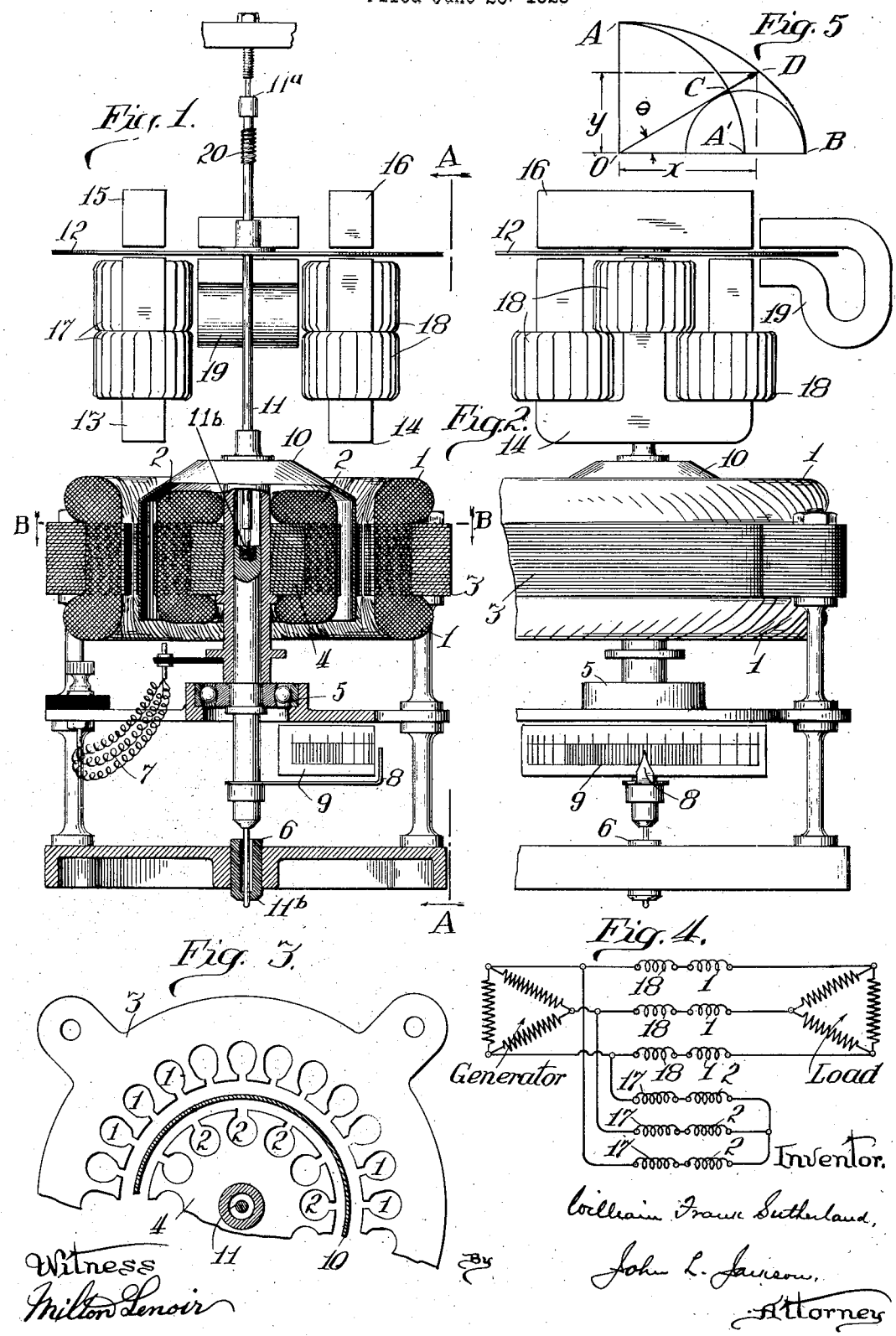

Patented Dec. 6, 1927.

1,651,482

UNITED STATES PATENT OFFICE.

WILLIAM FRANK SUTHERLAND, OF TORONTO, ONTARIO, CANADA.

ELECTRICAL MEASURING INSTRUMENT.

Application filed June 26, 1925. Serial No. 39,652.

My invention relates to meters or other instruments of the type wherein mechanical movements are produced proportionate to the quantitative characteristics of the circuit under consideration, and particularly to that type of instrument which indicates the product of volts and amperes in an electrical circuit through which an alternating current is flowing. More particularly the object of the invention is to provide a method and mechanism incorporating the method whereby, through the intermediary of suitable and well known recording or indicating means, the product of the voltage and current will be given without respect to any phase difference which may exist between them.

My present application differs from prior developments in that it refers to a method of measuring the volt-amperes in a polyphase circuit, by means of a device which is inherently a true polyphase meter and which does not require the summation of two or more single-phase torques or readings for the desired result.

I attain my result by the subjection of a torque element, from which an indication of the quantity being measured can be derived by any of the well known means, to the action of two rotating fluxes, in time phase and space phase, no space angle existing between the instantaneous directions of said fluxes, and proportional to voltage and current in the circuit under consideration. The summation of these two fluxes produces a resultant flux which acting on the torque element gives rise to a torque containing a magnitude proportional to that desired. Co-existent with this desired magnitude are terms which have to be balanced out and auxiliary means are provided for this purpose.

My invention can be considered as providing for the subjection of a torque element to the action of two rotating fluxes $\phi_E$ and $\phi_I$, respectively proportional to line voltage and line current, in such a manner that the resulting torque is proportional to the square of the sum of the two or $$(\phi_E + \phi_I)^2 = \phi_E^2 + 2\phi_E\phi_I + \phi_I^2$$

and the elimination of the two undesired components of this torque, $\phi_E^2$ and $\phi_I^2$, by means of auxiliary torque producing means acting independently to produce counter-torques of like magnitude. Since $\phi_E$ and $\phi_I$ are proportional to voltage and current it necessarily follows that their product $\phi_E \phi_I$ is a measure of the volt-amperes in the circuit.

The novel features of my invention which I believe to be patentable are definitely set forth in the appended claims. The principles of the invention together with the construction and mode of operation of one type of mechanism embodying the invention will be best understood from the following description together with the accompanying drawings.

For the purpose of this description I refer to the accompanying drawings in which like letters of designation and numerals refer to corresponding parts and in which:

Fig. 1 is a sectional elevation taken partly through the vertical axis;

Fig. 2 is an elevation on A—A;

Fig. 3 is a part plan on B—B showing the magnetic circuit in plan;

Fig. 4 is a diagram showing one connection of the device in an alternating current circuit; and Fig. 5 is a diagram of the flux relations under single phase current conditions and which is referred to more specifically below.

In Figs. 1, 2 and 3 reference 1 denotes a current winding, here shown of the distributed type and excited by polyphase current proportional phase by phase to line current. This winding is so connected as to produce a rotating field such as is found for instance in the induction motor. Within this winding is contained another polyphase winding, 2, excited by currents proportional to the voltages in the circuit under measurement. This winding also produces a rotating field similar to that produced by the current windings. For the purposes of mechanical support and for better flux utilization a laminated magnetic circuit is shown, consisting of a stationary part 3, on which the current winding is wound, and a movable portion or core 4 supporting the voltage winding 2. This voltage winding 2 and core 4 are mounted on a spindle carried on bearings 5 and 6 in such a manner as to be freely movable. Current carrying means 7 are shown for the leading in of current to the movable voltage winding.

On the excitation of both sets of windings two rotating fluxes are produced $\phi_E$ and $\phi_I$, proportional to voltage and current respectively. These fluxes tend to swing the movable element 4 into such a position as to make the resultant flux a maximum and to eliminate any spatial phase angle which may exist between them due to power factors other than unity in the circuit being measured. No continuous rotative effort is experienced by element 4 but an action similar to that present in the polyphase power factor meter takes place, an equilibrium position being maintained. A pointer 8 and scale 9 serve to give an indication of line power factor if such is desired.

Interposed between elements 3 and 4 and subjected to the resultant flux $\phi_E + \phi_I$ is a cup shaped torque element 10 carried on a spindle 11 and supported in bearings $11^a$, $11^b$ at top and bottom.

It is a well known fact easily demonstrated that the torque produced in a torque member, such as the rotor in an induction motor, or element 10 in this instance, is proportional to the square of the flux cutting it where such flux is of the gliding or rotating type. The resulting flux cutting torque element 10 has been represented as $\phi_E + \phi_I$, no space angle existing between the instantaneous directions of these flux components, in consequence of the corrective effect of the movable voltage coil and magnetic circuit 4.

The torque in consequence on member 10 can now be demonstrated as equal to $$(\phi_E + \phi_I)^2 = \phi_E^2 + 2\phi_E\phi_I + \phi_I^2$$

Since $\phi_E$ is proportional to voltage and $\phi_I$ to current we may write:

$$\phi_E^2 + 2\phi_E\phi_I + \phi_I^2 = E^2 + 2EI + I^2$$

The expression 2EI is a measure of the volt-amperes in the circuit being measured and is that portion of the torque sum desired. The two other components $E^2$ and $I^2$ are not desired and are eliminated by means of auxiliary mechanism as follows:

An auxiliary torque disc 12 is mounted on the spindle 11, and it is acted upon independently by two separate magnetic circuits 13 and 14 with adjustable armatures 15 and 16, for securing any necessary adjustment of flux strength. Voltage coils 17 excite one of these magnetic circuits and current coils 18 excite the other. By reference to Fig. 4 it will be seen that the same currents which excite the main windings 1 and 2 also excite the auxiliary windings 18 and 17 respectively. By design, the fluxes produced in magnetic circuits 13 and 14 are rotating in nature and produce counter-torques equal to the torques $\phi_E^2$ and $\phi_I^2$ produced in the main torque member, thus balancing these out and leaving the desired torque $2\phi_E\phi_I$ proportional to 2EI. A drag magnet 19 rendering speed proportional to volt-amperes, and a worm 20 gearing in with a register train, not shown, complete the mechanism for the purpose of volt-ampere hour measurement.

The arrangement indicated in the drawing is also merely indicative of one form of mechanism embodying the invention and a number of variations in mechanical arrangement can be carried out without departing from the spirit of the invention. For instance; while the main torque member 10 has been shown as cup-shaped, I do not wish to be limited to this form of construction, since it may prove commercially preferable to adopt the now standard construction of flat disc, such being still cut by the resultant of $\phi_E$ and $\phi_I$ in phase.

Unbalanced polyphase currents are correctly measured by my invention as can be proven by the following:

The maximum unbalance occurs when single phase current only is flowing. In this case the field produced by the stator or current windings may be considered to be composed of two fields rotating in opposite directions,—one rotating in the same direction, with the rotor field produced by the voltage circuit, and the other rotating in the opposite direction. Obviously the field rotating in the opposite sense cannot possibly lock in step with the rotor field and as a result the component of the field rotating in the same direction with the rotor field will naturally fall in step with it in such a way that their sum will be a maximum, provided as in this case, that the rotor is free to change its position in space until this condition is satisfied. Therefore even in single phase operation a condition exists which is similar to that for polyphase current with the exception that there is an additional field which rotates in the opposite direction. While this well-known method of analyzing a single phase field into circular rotating components serves to illustrate the manner in which the rotor positions itself in space, I prefer for the purpose of what follows to consider the field as a sinusoidally varying one of such a position in space that its maximum value occurs when the rotating field of flux in its rotation coincides with it.

Under these conditions an elliptical field of flux is created, vectorially represented in Fig. 5, where O C is the voltage flux fixed in magnitude but varying in spatial position; A' B is the maximum value of the sinusoidally varying current flux, the maximum value being reached when the voltage flux lies on the line O A' B. The vector O D represents by its length the magnitude of the resultant flux, and by its position in space the spatial location of the flux at any given instant measured by the angle θ from the X axis.

I have shown my invention as applied to a three-phase system, as in Fig. 4, but it is obvious that it is also equally applicable to any polyphase circuit whereby rotating or gliding fields can be produced, and therefore I do not wish to be limited to the exact circuit connections shown.

Where the expression "rotating" has been used in reference to magnetic fields this is understood to embrace fields of the gliding type wherein the radius of the line of action of the field may be said to approach infinity, and the flux direction is parallel to the axis of the torque disc, as is now common in meters of the watt-hour type.

What I claim as my invention and desire to secure by Letters Patent, is—

1. The method of measuring the volt-amperes in an alternating current circuit which consists in the subjection of a torque element to the action of a rotating field which is the arithmetical sum of two fields proportional to voltage and current respectively and the subjection of the torque element to the independent action of two fields producing torques proportional to the individual components of the main torque field but in the opposite sense.

2. The method of measuring the volt-amperes in an alternating current circuit which consists in the subjection of a torque element to the action of a rotating elliptical field having its minor axis proportional to one of the quantities whose product is being measured and its major axis proportional to the sum of the two quantities, and at the same time subjecting the torque element to the independent action of a rotating field of amplitude equal to the circular component of the elliptical field in torque value but in the opposite sense.

3. A volt-ampere meter comprising a torque element acted upon by fluxes produced by voltage and current windings, one of which fluxes at least shall be of the rotating type, means for bringing the fluxes into arithmetical summation and means comprising other voltage and current windings for annulling the torque effects produced by the independent action of the fluxes of said first mentioned windings.

4. A volt-ampere meter comprising a torque element acted upon by a rotating flux resulting from the summation of a flux proportional to voltage and a flux proportional to current, said fluxes coinciding in space with respect to their instantaneous directions; means for producing the said fluxes comprising voltage and current windings, and auxiliary means for subjecting said torque element to torques proportional to the individual components of said rotating flux field but in the opposite sense.

5. A volt-ampere meter comprising a torque element acted upon by a rotating elliptical field of flux, having its minor axis proportional to one of the quantities being measured and its major axis proportional to the sum of the two quantities; means comprising current and voltage windings for the production of the said fluxes, and means for the subjection of the torque element to the independent action of a rotating field of flux of amplitude equal to the circular component of the elliptical field in torque value but in the opposite sense.

6. A volt-ampere meter comprising voltage and current windings producing fluxes combining to produce a rotating field, means comprising a movable element for securing the instantaneous space coincidence of the voltage and current fluxes, a torque element cut by the said fluxes in instantaneous space coincidence, and means comprising other voltage and current windings for subjecting said torque element to torques proportional to the individual components of said rotating field but in the opposite sense.

7. A volt-ampere meter comprising a torque member acted upon by the flux in a magnetic circuit energized by current and voltage windings, means for bringing into coincidence fluxes resulting from line voltage and current through the relative movement of the respective voltage and current elements of said magnetic circuit, and means for producing counter torque effective on said torque member proportional to the individual components in the main torque.

8. In a volt-ampere meter for alternating current circuits, the combination of current and voltage windings arranged to produce a rotating flux field resulting from the summation of the flux proportional to voltage and the flux proportional to current, means movably supporting one of said windings for securing instantaneous space coincidence of said voltage and current fluxes, a torque element acted upon by said rotating flux field, and other current and voltage windings arranged to produce counter-torques effective on said torque element in proportion to the component fluxes of said rotating flux field.

9. In a volt-ampere meter for alternating current circuits, the combination of current and voltage windings, means rotatably supporting one of said windings for permitting angular movement thereof relative to the other winding, whereby the fluxes of said windings will have instantaneous space coincidence for producing a main rotating flux field which is the arithmetical sum of the two fluxes produced by said windings, a rotor element responsive to said main rotating flux field, secondary current and voltage windings arranged to create two independently acting fields producing counter-torques proportional to the individual flux components of said main flux field, and a secondary rotor element connected to said first rotor element and responsive to said independently acting fields.

10. In a volt-ampere meter of the class described, the combination of a current winding arranged to produce a rotating field, a voltage winding arranged to produce a rotating field, said windings being arranged concentrically with one of said windings held in stationary position, means rotatably supporting the other of said windings for permitting angular movement thereof relative to the stationary winding, whereby the fluxes of said windings will tend to assume instantaneous space coincidence for producing a main rotating flux field which is the arithmetical sum of the two fluxes produced by said windings, a rotor shaft, a cup shaped torque element mounted on said shaft and disposed in said rotating flux field between said windings, a secondary torque element on said shaft, and secondary current and voltage windings arranged to subject said secondary torque element to the independent action of two fields producing torques proportional to the individual components of said main rotating flux field but in the opposite sense.

WILLIAM FRANK SUTHERLAND.